United States Patent
Baghel et al.

(10) Patent No.: US 10,959,223 B2
(45) Date of Patent: Mar. 23, 2021

(54) TRANSMISSION TIME INTERVAL BUNDLING FOR WIRELESS COMMUNICATIONS SYSTEMS

(71) Applicant: QUALCOMM Incorporated, San Diego, CA (US)

(72) Inventors: Sudhir Kumar Baghel, Hillsborough, NJ (US); Tien Viet Nguyen, Bedminster, NJ (US); Shailesh Patil, San Diego, CA (US); Kapil Gulati, Dover, DE (US)

(73) Assignee: QUALCOMM Incorporated, San Diego, CA (US)

( * ) Notice: Subject to any disclaimer, the term of this patent is extended or adjusted under 35 U.S.C. 154(b) by 220 days.

(21) Appl. No.: 15/962,755

(22) Filed: Apr. 25, 2018

(65) Prior Publication Data

US 2018/0343652 A1     Nov. 29, 2018

Related U.S. Application Data

(60) Provisional application No. 62/511,228, filed on May 25, 2017.

(51) Int. Cl.
*H04W 72/04*     (2009.01)
*H04W 74/08*     (2009.01)
(Continued)

(52) U.S. Cl.
CPC ....... *H04W 72/0446* (2013.01); *H04L 5/0044* (2013.01); *H04W 4/70* (2018.02);
(Continued)

(58) Field of Classification Search
CPC ......... H04W 72/0406; H04W 72/0446; H04W 74/0808
See application file for complete search history.

(56) References Cited

U.S. PATENT DOCUMENTS

2016/0128028 A1 * 5/2016 Mallik ................ H04W 72/042
                                                                     370/336
2018/0295004 A1 * 10/2018 Gou .................. H04W 74/0808

FOREIGN PATENT DOCUMENTS

CN         106162898 A     11/2016
EP          3297380 A1      3/2018

OTHER PUBLICATIONS

International Search Report and Written Opinion—PCT/US2018/029617—ISA/EPO—Aug. 7, 2018.
(Continued)

*Primary Examiner* — Kodzovi Acolatse
*Assistant Examiner* — Farhad Ali

(57) ABSTRACT

Methods, systems, and devices are described for vehicle-to-everything (V2X) communication over one or more determined transmission time intervals (TTIs) in an unlicensed (shared) radio frequency spectrum band. A user equipment (UE) such as a vehicle may perform one or more listen-before-talk (LBT) mechanisms on the shared radio frequency spectrum and contend for access to available system resources. Upon gaining access, the UE may determine a data payload for transmission. The data type or payload may exceed a threshold and as a result, the UE may bundle a multiple TTIs for continuous data transmission. The UE may send control information, indicating a TTI bundling implementation as well as modification to the control or LBT symbols of subsequent TTIs of the data transmission, and subsequently perform data transmission over a plurality of TTIs.

14 Claims, 12 Drawing Sheets

(51) Int. Cl.
*H04W 4/70* (2018.01)
*H04L 5/00* (2006.01)
*H04L 27/00* (2006.01)

(52) U.S. Cl.
CPC ... *H04W 72/0406* (2013.01); *H04W 74/0808* (2013.01); *H04L 5/0053* (2013.01); *H04L 27/0006* (2013.01)

(56) References Cited

OTHER PUBLICATIONS

Zte et al., "Discusssion on NR Operation in Unlicensed Spectrum", 3GPP Draft, R1-1701619—8.1.10 Discussion on NR Operation in Unlicensed Spectrum, 3rd Generation Partnership Project (3GPP), Mobile Competence Centre, 650, Route Des Lucioles, F-06921 Sophia-Antipo, vol. RAN WG1, No. Athens, Greece, Feb. 13, 2017-Feb. 17, 2017, Feb. 12, 2017 (Feb. 12, 2017), XP051208786, 8 Pages, Retrieved from the Internet: URL:http://www.3gpp.org/ftp/Meetings_3GPP SYNC/RAN1/Docs/ [retrieved on Feb. 12, 2017].

* cited by examiner

TRANSMISSION TIME INTERVAL BUNDLING FOR WIRELESS COMMUNICATIONS SYSTEMS

CROSS REFERENCES

The present Application for Patent claims the benefit of U.S. Provisional Patent Application No. 62/511,228 by Baghel et al., entitled "Transmission Time Interval Bundling For Wireless Communications Systems," filed May 25, 2017, assigned to the assignee hereof, and expressly incorporated herein.

INTRODUCTION

The following relates generally to wireless communication, and more specifically to transmission time interval (TTI) bundling for wireless communications systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

A base station may communicate with UEs, such as vehicles, on downlink channels (e.g., for transmissions from a base station to a UE) and uplink channels (e.g., for transmissions from a UE to a base station). In some cases, vehicles may communicate directly with each other using device-to-device (D2D) communications over a D2D wireless link. Some systems provide for D2D communications in bands of a licensed radio frequency spectrum or an unlicensed (e.g., shared) radio frequency spectrum band. To communicate over shared resources, contention-based mechanisms such as listen-before-talk (LBT) may be employed. If contention is won, a vehicle may be allocated a TTI to transmit a data payload. However, a data payload may exceed the data resources of the TTI won by the vehicle and the vehicle may have to perform contention again prior to transmitting the remaining payload. This may result in discontinuous or delayed transmissions, which may increase latency, decrease throughput, or cause other performance issues.

SUMMARY

A method of wireless communication is described. The method may include identifying that a size of data to be transmitted to a vehicle via a shared radio frequency spectrum band allocated for vehicle to vehicle communications satisfies a size threshold. In some cases, the data may to be transmitted during a first transmission time interval (TTI) that includes listen-before-talk (LBT) symbols, control symbols, and data symbols. The method may further include identifying at least a second TTI during which the data will be transmitted to the vehicle based on the size of the data satisfying the size threshold. The second TTI may be adjacent to the first TTI. The method may include performing an LBT procedure on a carrier of the shared radio frequency spectrum band and transmitting, during the control symbols of the first TTI, an indication that the data will be transmitted during the data symbols and a gap symbol of the first TTI and during symbols of the second TTI. The symbols of the second TTI may be concatenated with the data symbols of the first TTI based on an outcome of the LBT procedure. The method may include transmitting the data during the data symbols, the gap symbol of the first TTI, and during the concatenated symbols of the second TTI.

An apparatus for wireless communication is described. The apparatus may include means for identifying that a size of data to be transmitted to a vehicle via a shared radio frequency spectrum band that may be allocated for vehicle to vehicle communications satisfies a size threshold. The data may to be transmitted during a TTI that may include LBT symbols, control symbols, and data symbols. The apparatus may also include means for identifying at least a second TTI during which the data will be transmitted to the vehicle based on the size of the data satisfying the size threshold, where the second TTI may be adjacent to the first TTI. Additionally, the apparatus may include means for performing an LBT procedure on a carrier of the shared radio frequency spectrum band and means for transmitting, during the control symbols of the first TTI, an indication that the data will be transmitted during the data symbols, a gap symbol of the first TTI, and during symbols of the second TTI. The symbols of the second TTI may be concatenated with the data symbols of the first TTI based on an outcome of the LBT procedure. Further, the apparatus may include means for transmitting the data during the data symbols, the gap symbol of the first TTI, and during the concatenated symbols of the second TTI.

Another apparatus for wireless communication is described. The apparatus may include a processor, memory in electronic communication with the processor, and instructions stored in the memory. The instructions may be operable to cause the processor to identify that a size of data to be transmitted to a vehicle via a shared radio frequency spectrum band allocated for vehicle to vehicle communications satisfies a size threshold. The data may to be transmitted during a TTI that includes LBT symbols, control symbols, and data symbols. The instructions may further be operable to identify at least a second TTI during which the data will be transmitted to the vehicle based on the size of the data satisfying the size threshold. In some cases, the second TTI may be adjacent to the first TTI. The instructions may additionally be operable to perform an LBT procedure on a carrier of the shared radio frequency spectrum band and transmit, during the control symbols of the first TTI, an indication. The indication may indicate that the data will be transmitted during the data symbols, a gap symbol of the first TTI, and during symbols of the second TTI that are concatenated with the data symbols of the first TTI based on an outcome of the LBT procedure. The instructions may also be operable to transmit the data during the data symbols, gap symbol of the first TTI, and during the concatenated symbols of the second TTI.

A non-transitory computer readable medium for wireless communication is described. The non-transitory computer-readable medium may include instructions operable to cause a processor to identify that a size of data to be transmitted to a vehicle via a shared radio frequency spectrum band allocated for vehicle to vehicle communications satisfies a size threshold. The data may to be transmitted during a first TTI that includes LBT symbols, control symbols, and data symbols. The instructions may be further operable to cause a processor to identify at least a second TTI during which the data will be transmitted to the vehicle based on the size of the data satisfying the size threshold, where the second TTI may be adjacent to the first TTI. Additionally, the instructions may be operable to cause a processor to perform an LBT procedure on a carrier of the shared radio frequency spectrum band and transmit, during the control symbols of the first TTI, an indication. The indication may indicate that the data will be transmitted during the data symbols, a gap symbol of the first TTI, and during symbols of the second TTI that are concatenated with the data symbols of the first TTI based at least in part on an outcome of the LBT procedure. The instructions may further be operable to transmit the data during the data symbols and the gap symbol of the first TTI and during the concatenated symbols of the second TTI.

In some examples of the method, apparatus, and non-transitory computer-readable medium described above, the concatenated symbols of the second TTI includes a set of control symbols, a set of LBT symbols, a set of data symbols, or a combination thereof.

In some examples of the method, apparatus, and non-transitory computer-readable medium described above, the indication may be included in a control message that may be transmitted via a control channel.

In some examples of the method, apparatus, and non-transitory computer-readable medium described above, a number of additional TTIs during which the data may be transmitted may be below a threshold number of TTIs.

Some examples of the method, apparatus, and non-transitory computer-readable medium described above may further include processes, features, means, or instructions for modifying transmission of a control message to be transmitted in the second TTI.

In some examples of the method, apparatus, and non-transitory computer-readable medium described above, modifying the transmission of the control message includes refraining from transmitting the control message via symbols of the second TTI allocated for the control message.

Some examples of the method, apparatus, and non-transitory computer-readable medium described above may further include processes, features, means, or instructions for transmitting at least a portion of the data via the symbols of the second TTI allocated for the control message.

In some examples of the method, apparatus, and non-transitory computer-readable medium described above, performing the LBT procedure includes listening for transmissions over the carrier of the shared radio frequency spectrum band, where a set of resources for transmission of the data may be determined based at least in part on the listening.

Some examples of the method, apparatus, and non-transitory computer-readable medium described above may further include processes, features, means, or instructions for transmitting an LBT reservation message indicating reservation of resources corresponding to the first TTI and the second TTI based at least in part on the listening.

In some examples of the method, apparatus, and non-transitory computer-readable medium described above, transmitting the LBT reservation message includes repeating transmission of a single LBT reservation message within an LBT symbol of the first TTI.

Some examples of the method, apparatus, and non-transitory computer-readable medium described above may further include processes, features, means, or instructions for transmitting a single cyclic prefix in the LBT symbol prior to repeating transmission of the single LBT reservation message.

Some examples of the method, apparatus, and non-transitory computer-readable medium described above may further include processes, features, means, or instructions for initiating an LBT counter for counting symbols following a symbol during which listening for transmissions may be performed.

In some examples of the method, apparatus, and non-transitory computer-readable medium described above, the LBT reservation message may be transmitted in a reservation symbol determined based at least in part on the LBT counter.

In some examples of the method, apparatus, and non-transitory computer-readable medium described above, the LBT reservation message may be transmitted in a symbol subsequent to a symbol allocated for the listening.

In some examples of the method, apparatus, and non-transitory computer-readable medium described above, the symbol subsequent to the symbol allocated for the listening follows a gap symbol.

In some examples of the method, apparatus, and non-transitory computer-readable medium described above, the size of the data exceeds the size threshold that corresponds to multiple TTIs.

In some examples of the method, apparatus, and non-transitory computer-readable medium described above, the data exceeds a latency threshold.

In some examples of the method, apparatus, and non-transitory computer-readable medium described above, the data includes ultra-reliable low latency communications (URLLC) data.

A method of wireless communication is described. The method may include receiving a first portion of data from a vehicle. The first portion of data may be received during data symbols and a gap symbol of a first TTI, where the first TTI may be allocated for data communications, within a shared radio frequency spectrum band allocated for vehicle to vehicle communications. The method may further include receiving, during symbols of at least a second TTI within the shared radio frequency spectrum band, a second portion of the data from the vehicle. The second TTI may be adjacent to the first TTI, and the symbols of the second TTI may be concatenated with the data symbols of the first TTI.

An apparatus for wireless communication is described. The apparatus may include means for receiving, during data symbols and a gap symbol of a first TTI within a shared radio frequency spectrum band allocated for vehicle to vehicle communications, a first portion of data from a vehicle. The first TTI may be allocated for data communication. The apparatus may further include means for receiving, during symbols of at least a second TTI within the shared radio frequency spectrum band, a second portion of the data from the vehicle. The second TTI may be adjacent to the first TTI, and the symbols of the second TTI may be concatenated with the data symbols of the first TTI.

Another apparatus for wireless communication is described. The apparatus may include a processor, memory in electronic communication with the processor, and instructions stored in the memory. The instructions may be operable to cause the processor to receive, during data symbols and a gap symbol of a first TTI within a shared radio frequency spectrum band allocated for vehicle to vehicle communications, a first portion of data from a vehicle, where the first TTI may be allocated for data communications. The instructions may be further operable to receive, during symbols of at least a second TTI within the shared radio frequency spectrum band, a second portion of the data from the vehicle. The second TTI may be adjacent to the first TTI, and the symbols of the second TTI may be concatenated with the data symbols of the first TTI.

A non-transitory computer readable medium for wireless communication is described. The non-transitory computer-readable medium may include instructions operable to cause a processor to receive, during data symbols and a gap symbol of a first TTI within a shared radio frequency spectrum band allocated for vehicle to vehicle communications, a first portion of data from a vehicle, where the first TTI may be allocated for data communications. The instructions may be further operable to cause the processor to receive, during symbols of at least a second TTI within the shared radio frequency spectrum band, a second portion of the data from the vehicle. The second TTI may be adjacent to the first TTI, and the symbols of the second TTI may be concatenated with the data symbols of the first TTI.

In some examples of the method, apparatus, and non-transitory computer-readable medium described above, the concatenated symbols of the second TTI include a set of control symbols, a set of LBT symbols, a set of data symbols, or a combination thereof.

Some examples of the method, apparatus, and non-transitory computer-readable medium described above may further include processes, features, means, or instructions for receiving an indication that the second portion of the data will be transmitted during the concatenated data symbols of the second TTI.

In some examples of the method, apparatus, and non-transitory computer-readable medium described above, the indication may be included in a control message that may be received via a control channel during control symbols of the first TTI.

In some examples of the method, apparatus, and non-transitory computer-readable medium described above, a number of TTIs during which the data may be received may be below a threshold number of TTIs.

In some examples of the method, apparatus, and non-transitory computer-readable medium described above, the second TTI may be allocated for control communications.

In some examples of the method, apparatus, and non-transitory computer-readable medium described above, a size of the data exceeds a size threshold corresponding to multiple TTIs.

In some examples of the method, apparatus, and non-transitory computer-readable medium described above, the data exceeds a latency threshold.

In some examples of the method, apparatus, and non-transitory computer-readable medium described above, the data includes URLLC data.

DETAILED DESCRIPTION

Figure 1:
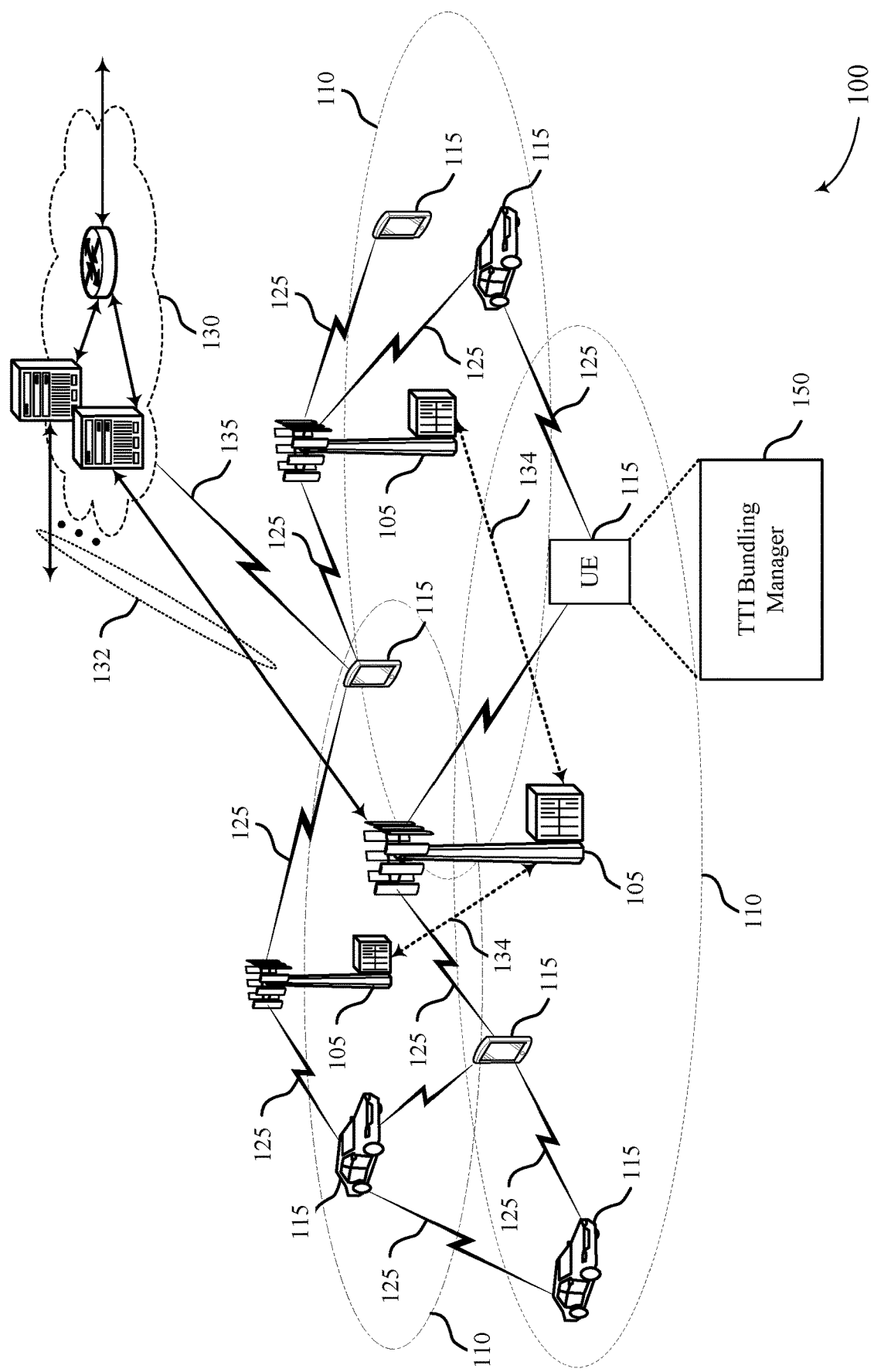
FIG. 1 illustrates an example of a system for wireless communication that supports transmission time interval (TTI) bundling for wireless communications systems in accordance with aspects of the present disclosure.

In a wireless communication system, two or more user equipments (UEs) may be in direct communication over licensed and unlicensed (shared) radio frequency spectrum band resources. To contend for access of the shared resources, a UE may support multiple services such as listen-before-talk (LBT) mechanisms or clear channel assessment (CCA) procedures. The LBT mechanisms may occupy one or more symbols within a transmission time interval (TTI), in association with control and data transmission. In some cases, the UE may attempt to transmit a data payload exceeding the resources allocated for a single TTI. In such instances, it may be beneficial for the UE to determine the size of the data to be transmitted and implement TTI bundling for the transmission of the data. In some examples, determining whether to perform TTI bundling may be based on the type of data to be transmitted (e.g., data having low latency standards) or a comparison of the data size to a threshold, among other factors.

According to aspects of the present disclosure, a UE may be configured for vehicle-to-everything (V2X) communications over a carrier (e.g., a channel, a sub band) of a shared radio frequency spectrum band. In some cases, the UE may perform LBT reception where the UE listens for communications over the carrier of the shared radio frequency spectrum band in order to determine whether resources are available for use by the UE. In some cases, the UE may receive control information from a second UE, which may indicate that data transmissions are scheduled for the second UE or other UEs within the system. The control information may include instructions, for implementation at the UE, to refrain from performing an LBT procedure over the carrier occupied by the scheduled data transmission. In some instances, the control information may indicate the duration of the scheduled data transmission. Following the data transmission, the UE may reinitiate LBT reception and again contend for access to the carrier.

During LBT reception, the UE may determine and contend for access of a set of resources within the shared radio frequency spectrum band. After LBT reception, the UE may modify its configuration by switching from a reception based configuration to a transmission based configuration, and initiate LBT transmission. The LBT transmission procedure may include transmission of an LBT sequence of an LBT reservation message, which may be repeated within one or more symbols allocated for LBT transmission. In some examples, the UE may be configured to skip LBT reception and a configuration modification and initiate an extended LBT transmission within one or more symbols of the TTI (e.g., the first one or more symbols of the TTI). The LBT sequence may include one or more identifiers, which may indicate a subsequent control channel transmission. In some cases, the LBT reservation message may span a portion of an LBT transmission. The LBT sequence may be repeated within the LBT reservation message and may include one or more cyclic prefixes.

Following LBT transmission, the UE may determine a data size or type associated with the data payload and in some cases, may transmit control information based on the data size or type. For data that exceeds or satisfies a given threshold, the UE may implement TTI bundling and may modify the configuration of one or more symbols within the TTIs subsequent to the first TTI of the bundled TTIs. The UE may then perform the data transmission, spanning one or more TTIs, over a sub band of the shared frequency bandwidth. When the control information indicates that TTI bundling is performed, the UE may use a gap symbol of the first TTI, LBT symbols, and control symbols of subsequent TTIs to transmit data. In some cases, the dynamic usage of LBT and control symbols of bundled TTIs may be indicated as part of control information, which may be transmitted in the first TTI.

Aspects of the disclosure are initially described in the context of a wireless communications system. Aspects are also described in the context of TTI bundling schemes and process flows. Aspects of the disclosure are further illustrated by and described with reference to apparatus diagrams, system diagrams, and flowcharts that relate to TTI bundling for wireless communications systems.

FIG. 1 illustrates an example of a wireless communications system 100 in accordance with one or more aspects of the present disclosure. The wireless communications system 100 includes base stations 105 (e.g., next generation NodeBs (gNBs), and/or radio heads (RHs)), UEs 115, and a core network 130. In some examples, the wireless communications system 100 may be a licensed system such as a Long Term Evolution (LTE) system, an LTE-Advanced (LTE-A) system, or a New Radio (NR) system. In some aspects, the wireless communications system 100 may be an unlicensed or shared system. Wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. A UE 115 may communicate with the core network 130 through communication link 135.

Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, a vehicle, or the like.

In some cases, a UE 115 may also be able to communicate directly with other UEs 115 (e.g., using a peer-to-peer (P2P) or device-to device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station 105 without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system 100 may be configured to provide ultra-reliable communications for these functions.

Base stations 105 may communicate with the core network 130 and with one another. For example, base stations 105 may interface with the core network 130 through backhaul links 132 (e.g., S1, S2). Base stations 105 may communicate with one another over backhaul links 134 (e.g., X1, X2) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

A base station 105 may be connected by an S1 interface to the core network 130. The core network 130 may be an evolved packet core (EPC), which may include at least one mobility management entity (MME), at least one serving gateway (S-GW), and at least one Packet Data Network (PDN) gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service.

The core network 130 may provide user authentication, access authorization, tracking, IP connectivity, and other access, routing, or mobility functions. At least some of the base stations 105 (e.g., eNBs, gNBs) may include subcomponents such as an access network entity, which may be an example of an access node controller (ANC). Each access network entity may communicate with a number of UEs 115 through a number of other access network transmission entities, each of which may be an example of a smart RH, or a transmission/reception point (TRP). In some configurations, various functions of each access network entity or base station 105 may be distributed across various network devices (e.g., RHs and ANCs) or consolidated into a single network device (e.g., a base station 105).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical layer, transport channels may be mapped to physical channels.

A shared radio frequency spectrum band may be utilized in unlicensed network or a shared spectrum system. For example, an NR shared spectrum may utilize any combination of licensed, shared, and unlicensed spectrums, among others. The flexibility of enhanced component carrier (eCC) symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In some cases, wireless system 100 may utilize both licensed and unlicensed radio frequency spectrum bands. For example, wireless system 100 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base stations 105 and UEs 115 may employ LBT procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communications system 100 may support V2X communications in an unlicensed (shared) radio frequency spectrum band. For example, a UE 115 may communicate with one or more neighboring UEs 115 via a direct wireless link (e.g., a PC5 interface link) over one or more carriers within the shared frequency bandwidth. The UE 115 may perform V2X communications in a manner which is consistent with V2X communication protocols and which complies with regulatory standards (i.e., medium access standards) for communicating over the shared frequency bandwidth.

UEs 115 may include a TTI bundling manager 150, which may determine that data to be transmitted to a UE, such as a vehicle, is of a certain type or satisfies a threshold. The threshold may be predetermined, obtained through control information, or otherwise preconfigured at the UE 115. In some cases, the data is to be transmitted over a shared radio frequency spectrum band from a first vehicle to a second vehicle using a bundled TTI that includes both first and second TTIs. The TTI bundling manager 150 may be used to perform an LBT procedure on a carrier of the shared spectrum to determine whether resources are available for transmission via a bundled TTI. In some examples, if sufficient resources are available, the TTI bundling manager 150 may transmit an indication that data will be transmitted using control symbols, LBT symbols, data symbols, or combinations thereof of each of the multiple TTIs. Symbols of the second TTI may be concatenated with the first TTI and the data may be transmitted over symbols of the first TTI and the concatenated symbols of the second TTI. In some aspects, the concatenated symbols include control symbols, LBT symbols, or data symbols.

One or more of the UEs 115 within wireless communication system 100 may be configured to generate an LBT counter. The LBT counter may serve as a timing mechanism used to implement LBT transmission. The LBT transmission may include an LBT reservation message. In some cases, the UE 115 may be configured with an LBT counter value distinct from one or more other UEs 115. Within a TTI, the UE 115 may implement an LBT procedure, which may include LBT reception (e.g., a CCA procedure), LBT transmission in accordance to the LBT counter, or both. The LBT reception procedure and LBT transmission procedure may be separated by a gap period (e.g., used for configuration modification). In some cases, the UE 115 may provide control channel transmission and a subsequent data transmission. The data transmission may span a single TTI or one or more bundled TTIs. When utilizing TTI bundling, each TTI subsequent to the initial TTI of the transmission may be modified such that one or more of the symbols allocated for LBT, control channel indication, uplink transmission, or UE configuration modification (e.g. reception to transmission configuration turnaround) may include data.

Figure 2:
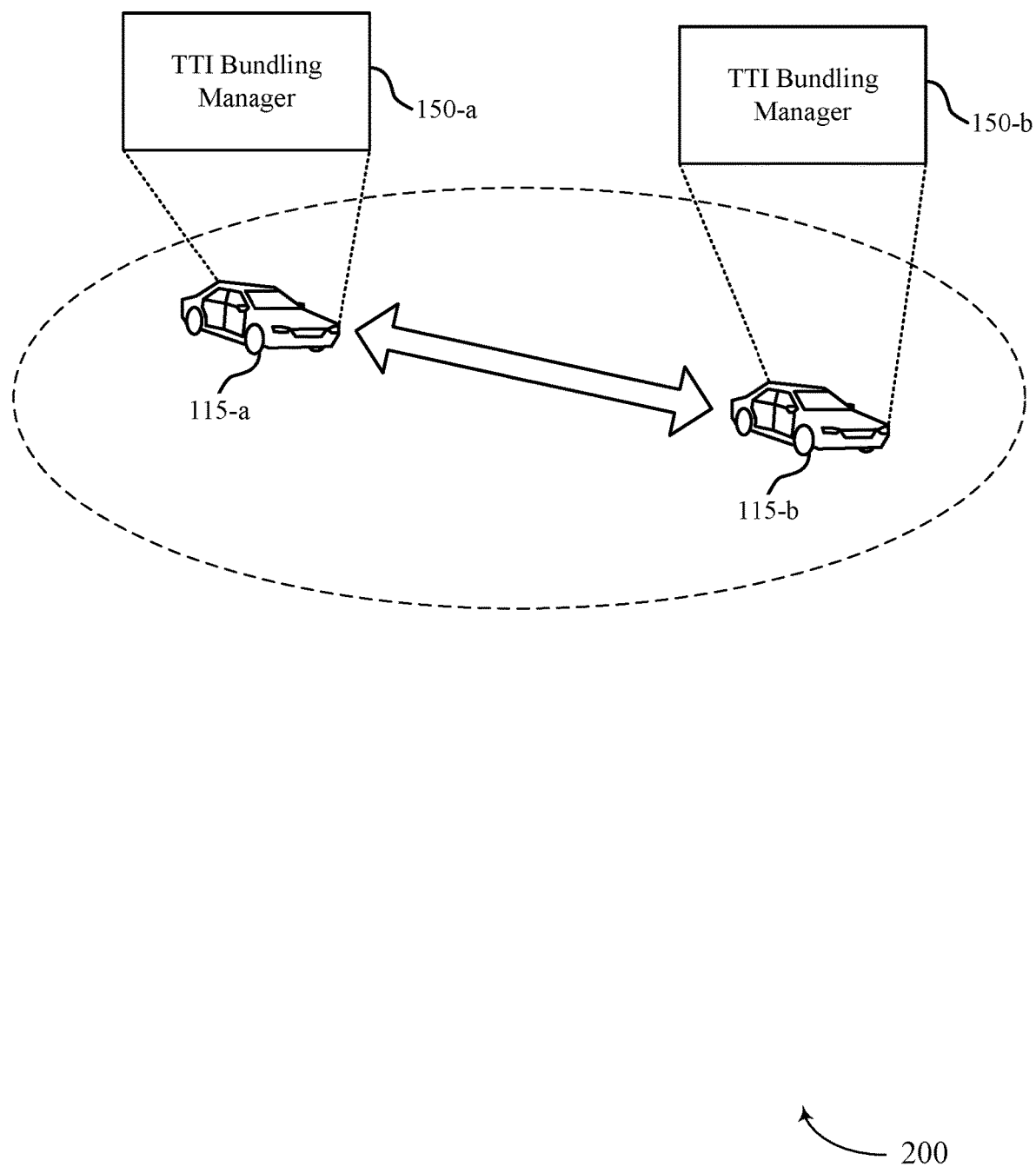
FIG. 2 illustrates an example of a wireless communications system that supports TTI bundling for wireless communications systems in accordance with one or more aspects of the present disclosure.

FIG. 2 illustrates an example of a wireless communications system 200 that supports TTI bundling for wireless communications systems in accordance with one or more aspects of the present disclosure. In some examples, wireless communications system 200 may implement aspects of wireless communication system 100.

In some examples, wireless communications system 200 may implement aspects of wireless communications system 100. Wireless communications system 200 may include UEs 115-a and 115-b, along with one or more corresponding UEs. UEs 115-a and/or 115-b may be examples of a UE 115 described with reference to FIG. 1 (e.g. a phone, laptop, vehicle), and may be configured for V2X communication over one or more carriers of a shared frequency bandwidth. In some examples, a vehicle, such as the UEs 115-a and 115-b, may execute one or more sets of codes or sequences, to control the functional elements of the device, and perform some or all of the functions described below.

UEs 115-a and 115-b may implement one or more LBT mechanisms and contend for access to sub bands of the frequency bandwidth. Each of the UEs 115-a and 115-b may be configured to generate an LBT, which may be randomly generated, and determine whether to perform an LBT procedure. Based on the LBT counter values, UEs 115-a and 115-b may initiate an LBT procedure, which may include LBT reception, LBT transmission, or both. In some examples, the LBT counter may take on a non-negative integer value, excluding one. In some cases, the LBT counter may correspond to the symbol value designated for LBT transmission during a current TTI.

In some cases, UE 115-a, UE 115-b, or both, may be configured with an LBT counter of integer value exceeding 1. In such instances, UE 115-a and/or 115-b may initiate LBT reception in the initial symbol of the current TTI. The LBT reception procedure may span one or more symbols of the TTI, and may involve a UE 115 listening for and detecting data traffic over one or more carriers. Based on the listening, the UE 115 may contend for available resources within the shared radio frequency spectrum band. LBT reception may involve a CCA procedure or may include decoding header information to identify the sources of interfering transmission. Upon gaining access to resources of a carrier, the UE 115 may switch from a reception-based configuration to a transmission-based configuration, and initiate LBT transmission within one or more subsequent symbols of the TTI. An LBT reservation message may be transmitted and may include an LBT sequence, an indication of resources occupied by other devices, as well as indication of a control channel transmission. In some cases, the LBT reservation message may span a portion of the LBT transmission, allowing the receiving UEs 115 time resources to alter automatic gain control (AGC) settings synchronously with the LBT transmission. In some examples, the UE 115 may repeat the LBT sequence or utilize one or more cyclic prefixes, to improve throughput of the transmitted LBT sequence.

A UE 115 may evaluate the data payload being transmitted and determine the data type or if the data payload satisfies a thresholds at the UE 115. If a the threshold is exceeded, the UE 115 may determine a TTI bundling implementation for the data payload transmission. For example, the UE 115 may implement TTI bundling for a data payload which exceeds a size threshold. Additionally or alternatively, the UE 115 may implement TTI bundling for a certain data type (e.g., ultra-reliable low latency communications (URLLC) data). The UE 115 may then perform a control channel transmission and one or more CCEs of the control channel transmission may include an indication of the duration of the data transmission. For cases of TTI bundling, the UE 115 may provide control information indicating TTI bundling for the data transmission and information related to the configuration of each subsequent TTI following the initial TTI of the data transmission. Specifically, the control information may include an indication that one or more of the symbols (e.g., control symbols or LBT symbols) within the TTIs succeeding the current TTI of the transmission may be modified to include data information.

After transmitting an indication of TTI bundling, a UE 115 may then perform the data transmission over the bundled TTIs. In some cases, the UE 115 may transmit data during one or more symbols of the current TTI as well as one or more of the bundled TTIs, as indicated in the control channel transmission. In some cases, UE 115 may modify the configuration of one or more TTIs succeeding the initial TTI of the data transmission. Specifically, the UE 115 may modify one or more of the symbols allocated for LBT, control, uplink, or UE configuration modification (e.g., reception to transmission configuration turnaround) to contain data during transmission. Within a TTI of the bundled TTI (e.g., the last TTI), data may precede one or more symbols allocated for uplink transmission, which may be followed by a guard period sharing a common boundary with the next TTI. In some cases, the UE 115 may allocate the guard period for switching from a transmission-based configuration to a reception-based configuration (e.g., for potential LBT reception procedure in the next TTI).

In some examples, a UE 115-a of wireless communication system 200, may receive an LBT transmission and subsequent control channel transmission from UE 115-b. The UE 115-a may identify and decode the control channel transmission received from UE 115-b, which may include an indication of TTI bundling. UE 115-a may then cease contending or refrain from contending for the remainder of the data transmission. In some cases, the UE 115-a may refrain from contending for access to the carrier indicated by the control channel transmission. In other cases, the UE 115-a may refrain from contending for access to all frequency resources of the shared radio frequency spectrum band (e.g., for the duration of the data transmission).

In some examples, a UE 115 may be configured with an LBT counter of integer value 0. In such cases, the UE 115 may forego an LBT reception procedure and initiate LBT transmission, which may include transmission of an LBT reservation message (e.g., via LBT resources of the initial symbol of the current TTI). In such instances, a guard period for switching from a reception-based configuration to a transmission-based configuration may not be used, as the UE 115 may not precede the initial symbol with an LBT reception procedure.

In some cases, the UE 115 may select resources without evaluating frequency bandwidth for data traffic or initiating access contention procedure (e.g., CCA procedure). For instance, the UE 115 may transmit an LBT reservation message, which may include an LBT sequence, an indication of occupied resources, as well as indication of control channel transmission. In some cases, the LBT reservation message may span a portion of the LBT transmission, which may allow the receiving UEs 115 time to alter AGC settings synchronously with the LBT transmission. For example, UE 115-a and/or UE 115-b may implement the AGC alteration in order to mitigate power saturation at the receiver. In some cases, the UE 115 may repeat the LBT sequence or utilize one or more cyclic prefixes (e.g., to improve throughput of the transmitted LBT sequence).

Figure 3:
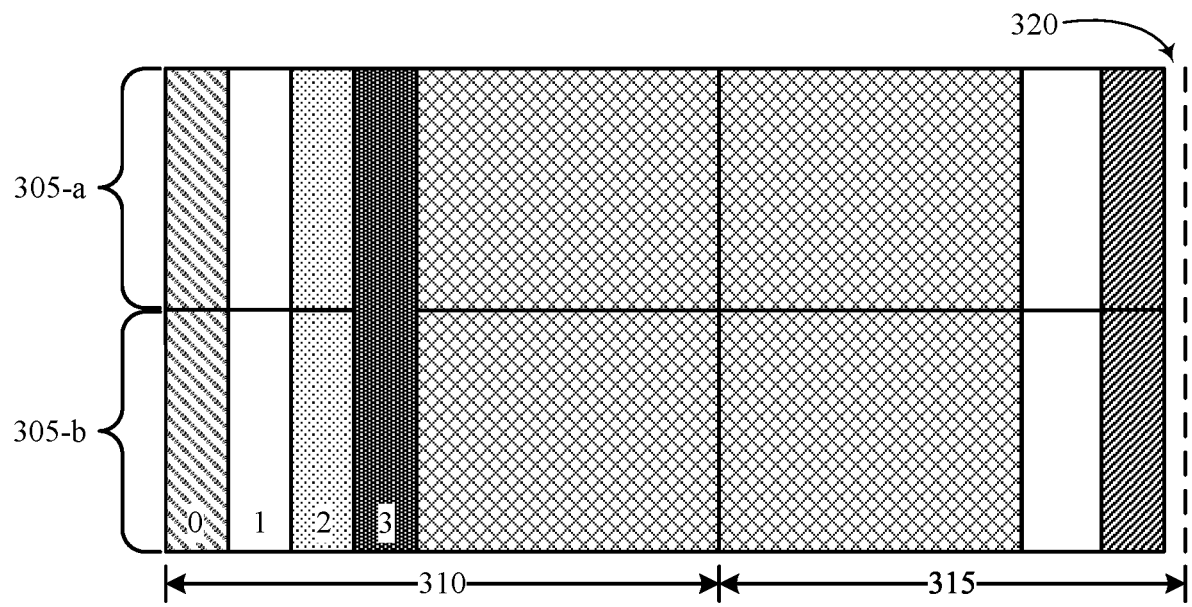
FIG. 3 illustrates an example of a TTI bundling scheme that supports TTI bundling for wireless communications systems in accordance with one or more aspects of the present disclosure.

FIG. 3 illustrates an example of a TTI bundling scheme 300 that supports TTI bundling for wireless communications systems in accordance with one or more aspects of the present disclosure. In some examples, TTI bundling scheme 300 may implement aspects of wireless communications systems 100 or 200 as described with reference to FIGS. 1 and 2. As shown, TTI bundling scheme 300 includes a first carrier 305-a and a second carrier 305-b and a first TTI 310 and a second TTI 315. In some examples, the first TTI 310 and second TTI 315 may constitute a bundled TTI.

A UE 115 may be configured for V2X communication over shared resources, such as an unlicensed or shared radio frequency spectrum band. A UE 115 may be capable of performing one or more LBT mechanisms that employ an LBT counter. As shown in the example of FIG. 3, a UE 115 may be configured with an LBT counter of 2, and may therefore perform LBT reception prior to LBT transmission. During symbol 0 of the first TTI 310, the UE 115 may perform LBT reception. During LBT reception, the UE 115 may monitor one or more carriers 305 and listen for data traffic to determine whether resources of the shared radio frequency spectrum band are available for use. Upon a determination that resources are available transmission, the UE 115 may switch from a reception-based configuration to a transmission-based configuration within symbol 1. At symbol 2, the UE 115 may initiate an LBT transmission procedure, which may include transmission of an LBT sequence within an LBT reservation message. The LBT reservation message may include an indication of the resources that will be used for transmission by the UE 115. In some cases, the LBT reservation message may span a portion of the LBT transmission, allowing one or more receiving UEs 115 time resources to alter AGC settings synchronously with the LBT transmission. In some cases, the UE 115 may configure the LBT sequence to be repeated within the LBT transmission and include a cyclic prefix to improve throughput of the transmitted LBT sequence.

The UE 115 may determine a data type or size of the data payload for transmission. In some cases, the UE may determine that the data payload exceeds a threshold. Based on the determination, the UE 115 may implement TTI bundling to transmit the data payload over a bundled TTI that includes first TTI 310 and second TTI 315. The UE 115 may transmit control information in symbol 3 of the first TTI 310 and in some instance, one or more CCEs of the control transmission may include an indication of TTI bundling (e.g., the control information may indicate that the data transmission spans both the first TTI 310 and the second 315). The control information may also indicate one or more of the symbols (e.g., LBT symbols, control symbols, data symbols) in second TTI 315 that are to contain data.

The UE 115 may then perform the data transmission over multiple symbols of the first TTI 310 as well as symbols of the second TTI 315 that are concatenated with one or more symbols of the first TTI 310. In some examples, the UE 115 may modify one or more of the symbols allocated for LBT, control information, uplink, or UE configuration modification (e.g., reception to transmission configuration turn-around) of second TTI 315 to contain data during transmission over the bundled TTI. According to some aspects, the UE 115 may designate the last symbol of the second TTI 315 for uplink transmission. The last symbol may be followed by a guard period 320 sharing a common boundary with the next TTI. During the guard period 320, the UE 115 may switch from a transmission-based configuration to a reception-based configuration (e.g., for potential LBT reception procedure in the next TTI).

Figure 4:
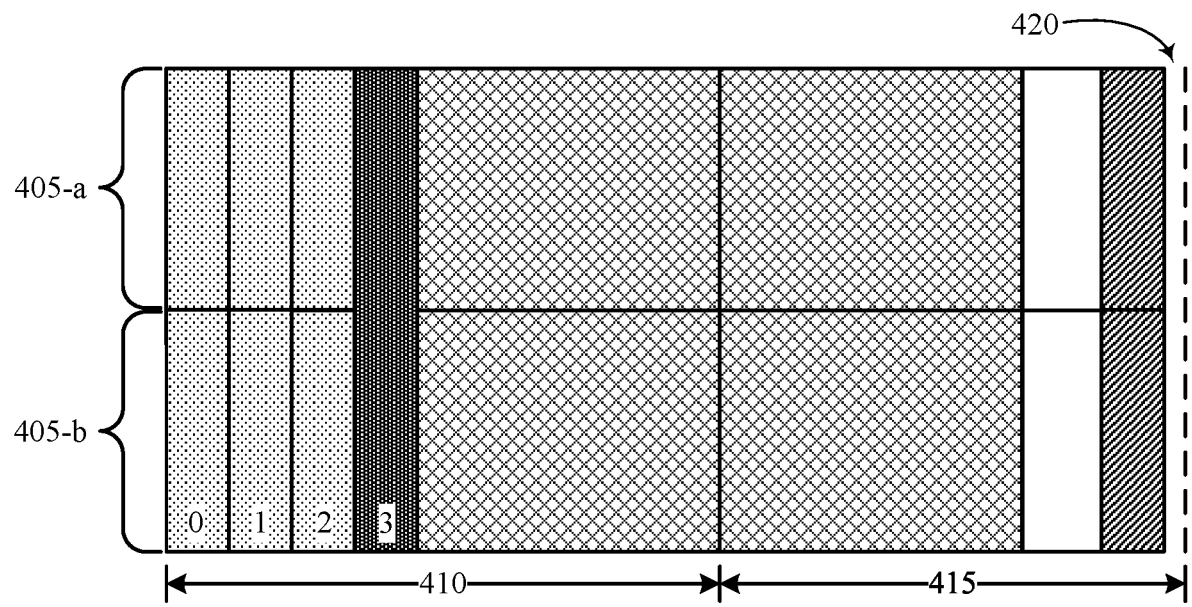
FIG. 4 illustrates an example of a TTI bundling scheme that supports TTI bundling for wireless communications systems in accordance with one or more aspects of the present disclosure.

FIG. 4 illustrates an example of a TTI bundling scheme 400 that supports TTI bundling for wireless communications systems in accordance with one or more aspects of the present disclosure. In some examples, TTI bundling scheme 400 may implement aspects of wireless communication systems 100 or 200 as described with reference to FIGS. 1 and 2. As shown, TTI bundling scheme 400 includes a first carrier 405-a and a second carrier 405-b and a first TTI 410 and a second TTI 415. In some examples, the first TTI 410 and second TTI 415 may constitute a bundled TTI.

A UE 115 may be configured for V2X communication over shared resources, such as an unlicensed or shared radio frequency spectrum band. A UE 115 may be capable of performing one or more LBT mechanisms that employ an LBT counter. As shown in the example of FIG. 4, a UE 115 may be configured with an LBT counter of 0, and may therefore forego an LBT reception procedure. The UE 115 may access and reserve carriers 405-a and 405-b of the shared radio frequency spectrum band initiate LBT transmission during symbol 0 of the first TTI 410. The LBT transmission may extend across the first three symbols of the first TTI 410 (symbols 0, 1, and 2). In some examples, the LBT transmission may include an LBT reservation message, which may include an LBT sequence. The LBT transmission may also include an indication of resources to be used by the UE 115, and an indication of subsequent control channel transmission. The LBT reservation message may span a portion of the numbers of symbols allocated for LBT transmission, which may allow one or more receiving UEs time to alter AGC settings synchronously with the LBT transmission. In some cases, the UE 115 may configure the LBT transmission to span a portion of the aggregate duration of symbols 0, 1, and 2, and include a cyclic prefix of the LBT transmission. In other cases, the UE 115 may configure the LBT transmission to span a certain portion of each of symbols 0, 1, and 2 individually, and include a cyclic prefix of the LBT transmissions for each symbol. The UE 115 may determine a data type or size of the data payload for transmission. In some cases, the UE may determine that the data payload exceeds a threshold. Based on the determination, the UE 115 may implement TTI bundling to transmit the data payload over a bundled TTI that includes first TTI 410 and second TTI 415. The UE 115 may transmit control information in symbol 3 of the first TTI 410 and in some instance, one or more CCEs of the control transmission may include an indication of TTI bundling (e.g., the control information may indicate that the data transmission spans both the first TTI 410 and the second 415). The control information may also indicate one or more of the symbols (e.g., LBT symbols, control symbols, data symbols) in second TTI 415 that are to contain data.

The UE 115 may then perform the data transmission over multiple symbols of the first TTI 410 as well as symbols of the second TTI 415 that are concatenated with one or more symbols of the first TTI 410. In some examples, the UE 115 may modify one or more of the symbols allocated for LBT, control information, uplink, or UE configuration modification (e.g., reception to transmission configuration turn-around) of second TTI 415 to contain data during transmission over the bundled TTI. According to some aspects, the UE 115 may designate the last symbol of the second TTI 415 for uplink transmission. The last symbol may be followed by a guard period 420 sharing a common boundary with the next TTI. During the guard period 420, the UE 115 may switch from a transmission-based configuration to a reception-based configuration (e.g., for potential LBT reception procedure in the next TTI).

Figure 5:
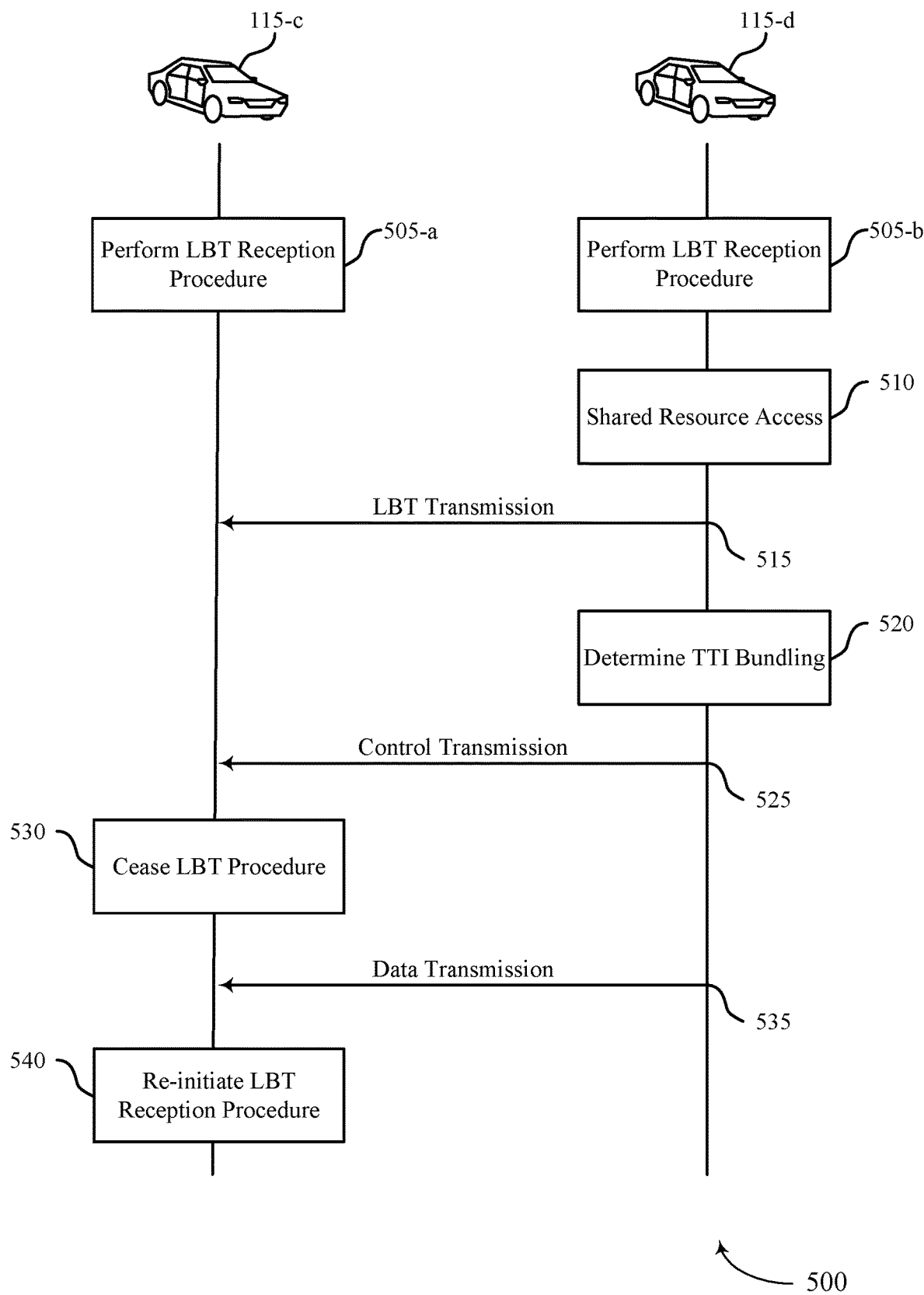
FIG. 5 illustrates an example of a process flow that supports TTI bundling for wireless communications systems in accordance with one or more aspects of the present disclosure.

FIG. 5 illustrates an example of a process flow 500 that supports TTI bundling for wireless communications systems in accordance with various aspects of the present disclosure. In some examples, process flow 500 may implement aspects of wireless communications systems 100 or 200 as described with reference to FIGS. 1 and 2. In some cases, process flow 500 may represent aspects of techniques performed by one or more vehicles such as UEs 115, as described with reference to FIGS. 1, 2, and 3. Within process flow 500, UE 115-*c* and UE 115-*d* may be configured with a counter of integer value exceeding 1, and may implement both LBT reception and LBT transmission procedures.

At 505, UEs 115-*c* and 115-*d* may each perform LBT reception to listen for data traffic over one or more carriers of the shared radio frequency spectrum band. The LBT reception procedure may span one or more symbols of a first TTI. UE 115-*c* and UE 115-*d* may detect and identify resources available for transmission. LBT reception procedures may involve a CCA procedure or may include decoding header information to identify sources of detected traffic.

At 510, UE 115-*d* may contend for and gain access to the at least a portion of the available resources identified by UE 115-*d* as being unused or having traffic below a certain threshold. UE 115-*d* may then initiate the configured LBT counter and switch from a reception-based configuration to a transmission-based configuration in a subsequent symbol of the TTI. UE 115-*d* may perform the configuration switch during a guard period, and alter the configuration of one or more components, ports, antennas, or additional features for control and data transmission.

At 515, UE 115-*d* may perform an LBT transmission based at least in part on the listening. The LBT transmission may include an LBT reservation message, an LBT sequence, and one or more identifiers indicating a subsequent control channel transmission. UE 115-*d* may transmit the LBT transmission to UE 115-*c* in one or more symbols following the guard period, based at least in part on the LBT counter. In some cases, the LBT reservation message may span a portion of the time resources allocated for LBT transmission. Receiving UE 115-*c*, along with one or more corresponding receiving UEs, may alter AGC settings at the receiver synchronously with the received LBT transmission. The LBT sequence contained within the LBT transmission may be repeated and may include one or more cyclic prefixes (e.g., to improve throughput at UE 115-*c*).

At 520, UE 115-*d* may determine whether to use TTI bundling. In some cases, determining whether to use TTI bundling may include identifying the data type or size of the data to be transmitted. For instance, if the data type is URLLC data or if the data size satisfies a threshold, UE 115-*d* may determine to implement TTI bundling for transmission of the data. In some instances, the TTI bundling may include multiple TTIs, which may be based on a maximum number of available TTIs or a maximum number of supported TTIs.

At 525, UE 115-*d* may perform control transmission (e.g., to the UE 115-*c*). One or more CCEs of the control transmission may include an indication of the duration of the data transmission. In some examples, UE 115-*d* may include an indication of TTI bundling within the control transmission. The TTI bundling indication may include information related to the number of TTIs bundled for the data transmission, as well as information regarding the configuration of each subsequent TTI following the initial TTI of the data transmission. Specifically, UE 115-*d* may indicate that one or more of the symbols of the subsequent TTIs that are to be modified to include data information.

Further, in some implementations, UE 115-*d* may transmit instructions during the control transmission (e.g., to the receiving UE 115-*c*), which may include an indication for each receiving UE, such as UE 115-*c*, to cease or refrain from performing an LBT procedure during the bundled TTIs corresponding to the data transmission or over resources used to transmit the bundled TTIs.

At 530, UE 115-*c* may receive the control transmission from UE 115-*d* and an indication of the duration of the bundled TTI transmission. In some cases, based on the control transmission, UE 115-*c* may cease or refrain from performing an LBT reception procedure until the data transmission over the bundled TTIs is completed. In some instances, UE 115-*c* may cease LBT reception over the carrier used by UE 115-*d*. In other cases, UE 115-*c* may cease LBT reception over all resources of the shared band.

At 535, UE 115-*d* may perform the data transmission over the bundled TTIs. In some cases, the UE 115-*d* may modify the configuration of one or more TTIs succeeding the initial TTI, and transmit the data over a concatenated set of symbols spanning the bundled TTIs. In some embodiments, UE 115-*d* may modify one or more of the symbols allocated for LBT, control, uplink, or UE configuration modification within the succeeding TTIs to contain data. Within the last TTI of the bundled TTIs, the data may precede one or more symbols allocated for uplink transmission. The symbols allocated for uplink transmission may be followed by a guard period sharing a common boundary with the next TTI. In some cases, UE 115-*c* may receive and decode the data transmitted over the bundled TTIs.

At 540, UE 115-*c* may reinitiate LBT reception procedure and contend for access to the shared band. In some cases, UE 115-*c* may reinitiate LBT reception over resources previously occupied by UE 115-*d*. In other cases, UE 115-*c* may reinitiate LBT reception over all subcarriers of the shared frequency bandwidth.

Figure 6:
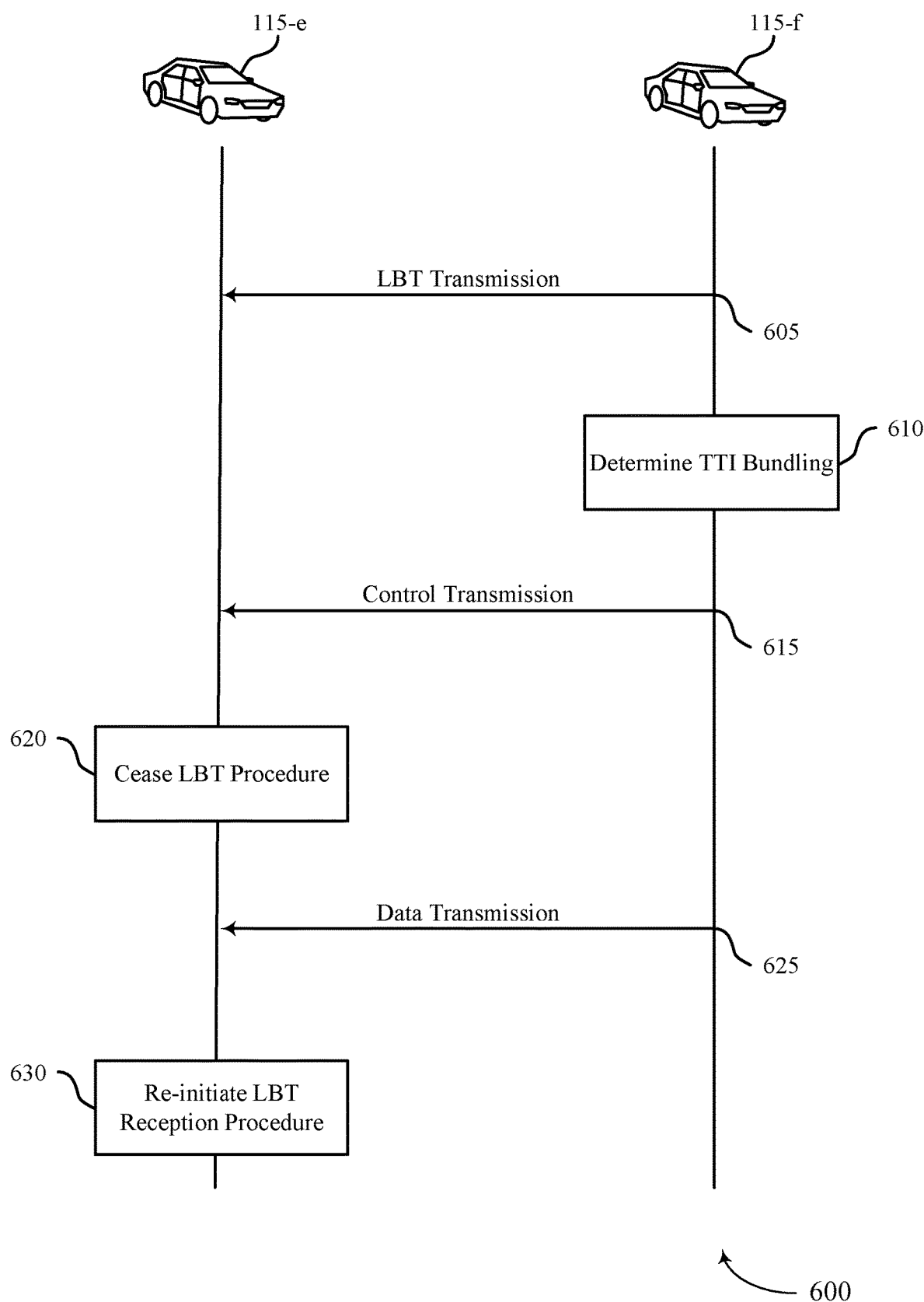
FIG. 6 illustrates an example of a process flow that supports TTI bundling for wireless communications systems in accordance with one or more aspects of the present disclosure.

FIG. 6 illustrates an example of a process flow 600 that supports TTI bundling for wireless communications systems in accordance with various aspects of the present disclosure. In some examples, process flow 600 may implement aspects of wireless communications systems 100 or 200 as described with reference to FIGS. 1 and 2. In some cases, process flow 500 may represent aspects of techniques performed by one or more vehicles such as UEs 115, as described with reference to FIGS. 1, 2, and 4. Within process flow 600, UE 115-*f* may be configured with a counter of integer value 0, and therefore enact LBT transmission without monitoring one or more carriers of the shared radio frequency spectrum band and without performing LBT reception.

At 605, UE 115-*f* may forego LBT reception and initiate an LBT counter. Based on the LBT counter, the UE 115-*f* may perform LBT transmission in the initial symbol of a first TTI. The LBT transmission may span a plurality of symbols within the first TTI, and may include an LBT reservation message, an LBT sequence, and an indication of a subsequent control channel transmission. In some cases, the LBT reservation message may span a portion of the time resources allocated for LBT transmission. Receiving UE 115-*e* may alter AGC settings at the receiver synchronously with the received LBT transmission. The LBT sequence contained within the LBT transmission may be repeated and include one or more cyclic prefixes (e.g., to improve throughput at UE 115-*e*).

At 610, UE 115-*f* may determine whether to use TTI bundling. In some cases, determining whether to use TTI bundling may include identifying the data type or size of the data to be transmitted. For instance, if the data type is URLLC data or if the data size satisfies a threshold, UE 115-*f* may determine to implement TTI bundling for transmission of the data. In some cases, the TTI bundling may include multiple TTIs, which may be based on a maximum number of available TTIs or a maximum number of supported TTIs.

At 615, UE 115-*d* may perform control transmission (e.g., to the UE 115-*e*). One or more CCEs of the control transmission may include an indication of the duration of the data transmission. In some examples, UE 115-*f* may include an indication of TTI bundling within the control transmission. The TTI bundling indication may include information related to the number of TTIs bundled for the data transmission, as well as information regarding the configuration of each subsequent TTI following the initial TTI of the data transmission. Specifically, UE 115-*f* may indicate that one or more of the symbols of the subsequent TTIs that are to be modified to include data information.

Further, in some implementations, UE 115-*f* may transmit instructions during the control transmission (e.g., to the receiving UE 115-*e*), which may include an indication for each receiving UE, such as UE 115-*e*, to cease or refrain from performing an LBT procedure during the bundled TTIs corresponding to the data transmission or over resources used to transmit the bundled TTIs.

At 620, UE 115-*e* may receive the control transmission from UE 115-*f* and an indication of the duration of the bundled TTI transmission. In some cases, based on the control transmission, UE 115-*e* may cease or refrain from performing an LBT reception procedure until the data transmission over the bundled TTIs is completed. In some cases, UE 115-*e* may cease LBT reception over the carrier used by UE 115-*f*. In other cases, UE 115-*e* may cease LBT reception over all resources of the shared band.

At 625, UE 115-*f* may perform the data transmission over the bundled TTIs. In some cases, the UE 115-*f* may modify the configuration of one or more TTIs succeeding the initial TTI, and transmit the data over a concatenated set of symbols spanning the bundled TTIs. In some instances, UE 115-*f* may modify one or more of the symbols allocated for LBT, control, uplink, or UE configuration modification within the succeeding TTIs to contain data. Within the last TTI of the bundled TTIs, the data may precede one or more symbols allocated for uplink transmission. The symbols allocated for uplink transmission may be followed by a guard period sharing a common boundary with the next TTI. In some cases, UE 115-*e* may receive and decode the data transmitted over the bundled TTIs.

At 630, UE 115-*e* may reinitiate LBT reception procedure and contend for access to the shared band. In some cases, UE 115-*e* may reinitiate LBT reception over resources previously occupied by UE 115-*f*. In other cases, UE 115-*e* may reinitiate LBT reception over all subcarriers of the shared frequency bandwidth.

Figure 7:
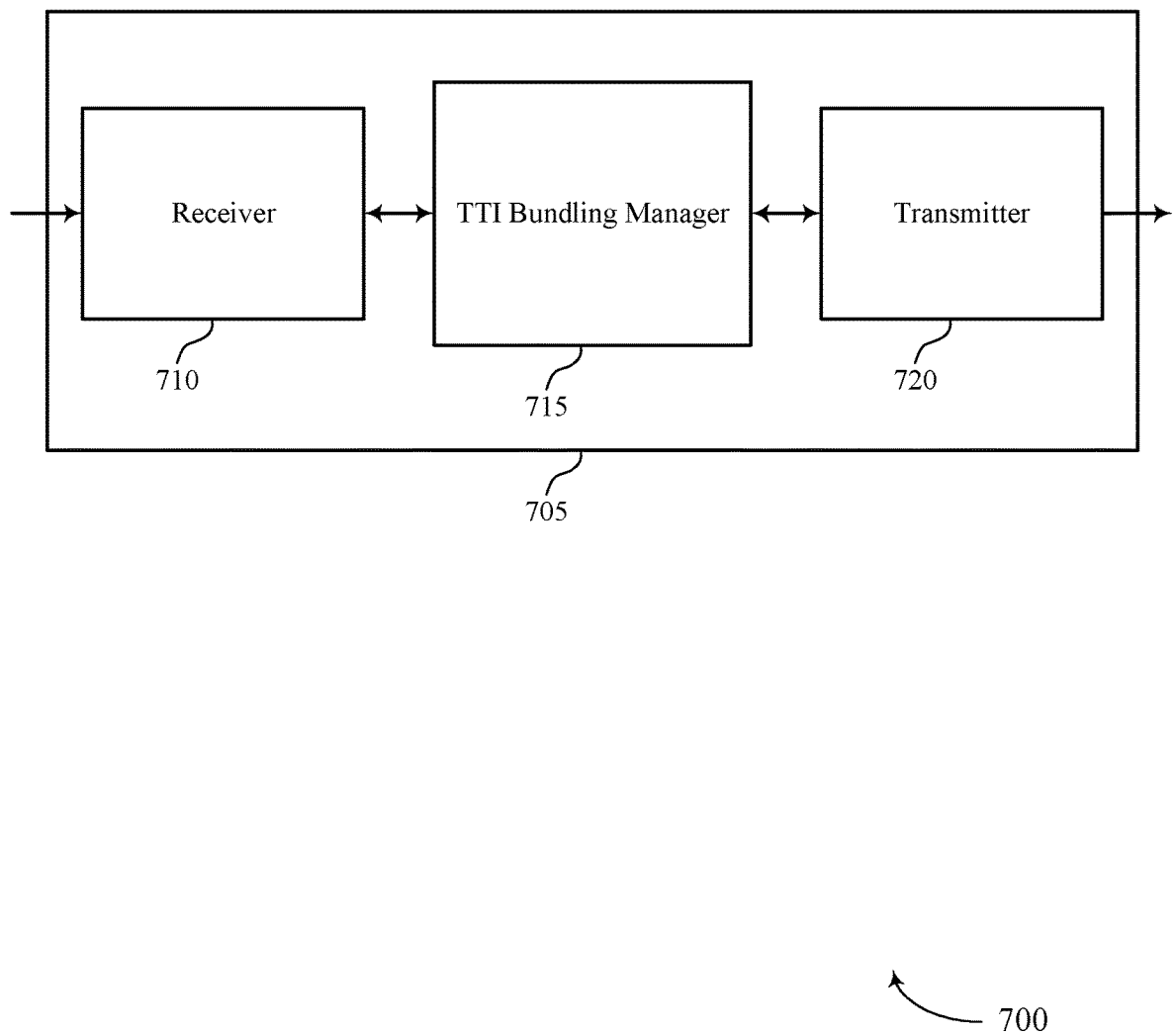
FIGS. 7 through 9 show block diagrams of a device that supports TTI bundling for wireless communications systems in accordance with one or more aspects of the present disclosure.

FIG. 7 shows a block diagram 700 of a wireless device 705 that supports TTI bundling for wireless communications systems in accordance with aspects of the present disclosure. Wireless device 705 may be an example of aspects of a UE 115 as described herein. Wireless device 705 may include receiver 710, TTI bundling manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to TTI bundling for wireless communications systems). Information may be passed on to other components of the device. The receiver 710 may be an example of aspects of the transceiver 1035 described with reference to FIG. 10. The receiver 710 may utilize a single antenna or a set of antennas.

TTI bundling manager 715 may be an example of aspects of the TTI bundling manager 1015 described with reference to FIG. 10. TTI bundling manager 715 and/or at least some of its various sub-components may be implemented in hardware, software executed by a processor, firmware, or any combination thereof. If implemented in software executed by a processor, the functions of the TTI bundling manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The TTI bundling manager 715 and/or at least some of its various sub-components may be physically located at various positions, including being distributed such that portions of functions are implemented at different physical locations by one or more physical devices. In some examples, TTI bundling manager 715 and/or at least some of its various sub-components may be a separate and distinct component in accordance with various aspects of the present disclosure. In other examples, TTI bundling manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

TTI bundling manager 715 may identify that a size of data to be transmitted to a vehicle via a shared radio frequency spectrum band allocated for vehicle to vehicle communications satisfies a size threshold, the data to be transmitted during a first TTI that includes LBT symbols, control symbols, and data symbols. The TTI bundling manager 715 may identify at least a second TTI during which the data will be transmitted to the vehicle based on the size of the data satisfying the size threshold, the second TTI being adjacent to the first TTI, and perform an LBT procedure on a carrier of the shared radio frequency spectrum band. In some cases, the TTI bundling manager 715 may transmit, during the control symbols of the first TTI, an indication that the data will be transmitted during the data symbols and a gap symbol of the first TTI and during symbols of the second TTI that are concatenated with the data symbols of the first TTI based on an outcome of the LBT procedure, and transmit the data during the data symbols and the gap symbol of the first TTI and during the concatenated symbols of the second TTI.

The TTI bundling manager 715 may also receive, during data symbols and a gap symbol of a first TTI within a shared radio frequency spectrum band allocated for vehicle to vehicle communications, a first portion of data from a vehicle, the first TTI allocated for data communications and receive, during symbols of at least a second TTI within the shared radio frequency spectrum band, a second portion of the data from the vehicle, the second TTI being adjacent to the first TTI, and the symbols of the second TTI being concatenated with the data symbols of the first TTI.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
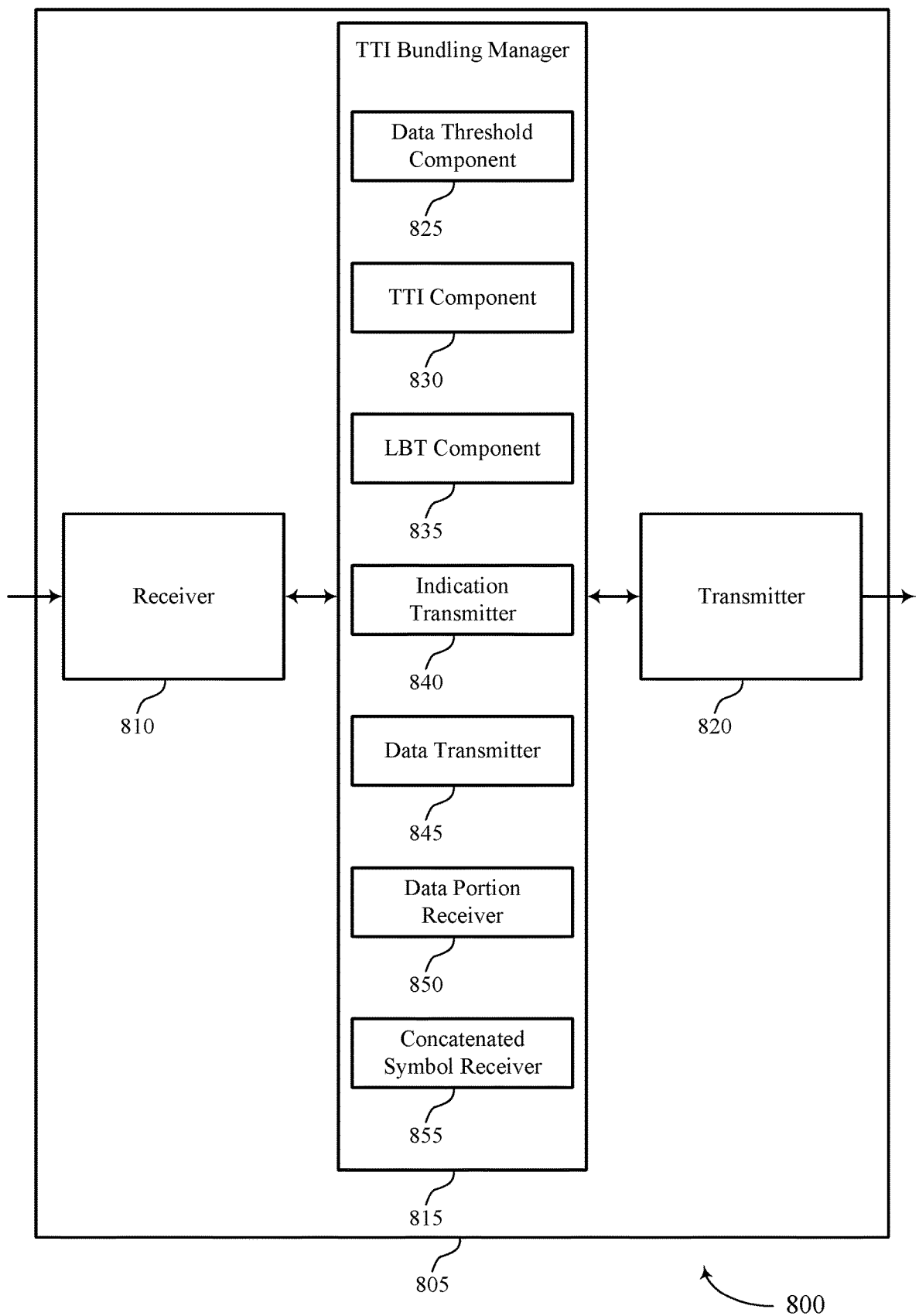

FIG. 8 shows a block diagram 800 of a wireless device 805 that supports TTI bundling for wireless communications systems in accordance with aspects of the present disclosure. Wireless device 805 may be an example of aspects of a wireless device 705 or a UE 115 as described with reference to FIG. 7. Wireless device 805 may include receiver 810, TTI bundling manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to TTI bundling for wireless communications systems). Information may be passed on to other components of the device. The receiver 810 may be an example of aspects of the transceiver 1035 described with reference to FIG. 10. The receiver 810 may utilize a single antenna or a set of antennas.

TTI bundling manager 815 may be an example of aspects of the TTI bundling manager 1015 described with reference to FIG. 10. TTI bundling manager 815 may also include data threshold component 825, TTI component 830, LBT component 835, indication transmitter 840, data transmitter 845, data portion receiver 850, and concatenated symbol receiver 855.

Data threshold component 825 may identify that a size of data to be transmitted to a vehicle via a shared radio frequency spectrum band allocated for vehicle to vehicle communications satisfies a size threshold, the data to be transmitted during a first TTI that includes LBT symbols, control symbols, and data symbols. In some cases, the size of the data exceeds the size threshold that corresponds to multiple TTIs. In some examples, the data may exceed a latency threshold. In some examples, the data may include URLLC data.

TTI component 830 may identify at least a second TTI during which the data will be transmitted to the vehicle based on the size of the data satisfying the size threshold, the second TTI being adjacent to the first TTI. In some cases, a number of additional TTIs during which the data is transmitted is below a threshold number of TTIs.

LBT component 835 may perform an LBT procedure on a carrier of the shared radio frequency spectrum band, transmit an LBT reservation message indicating reservation of resources corresponding to the first TTI and the second TTI based on the listening, transmit a single cyclic prefix in the LBT symbol prior to repeating transmission of the single LBT reservation message, and initiate an LBT counter for counting symbols following a symbol during which listening for transmissions is performed. In some cases, performing the LBT procedure includes listening for transmissions over the carrier of the shared radio frequency spectrum band, where a set of resources for transmission of the data is determined based on the listening. In some examples, transmitting the LBT reservation message include repeating transmission of a single LBT reservation message within an LBT symbol of the first TTI. In some cases, the LBT reservation message is transmitted in a reservation symbol determined based on the LBT counter. In some aspects, the LBT reservation message is transmitted in a symbol subsequent to a symbol allocated for the listening. In some implementations, the symbol subsequent to the symbol allocated for the listening follows a gap symbol.

Indication transmitter 840 may transmit, during the control symbols of the first TTI, an indication that the data will be transmitted during the data symbols and a gap symbol of the first TTI and during symbols of the second TTI that are concatenated with the data symbols of the first TTI based on an outcome of the LBT procedure. In some cases, the concatenated symbols of the second TTI include a set of control symbols, a set of LBT symbols, a set of data symbols, or a combination thereof. In some instances, the indication is included in a control message that is transmitted via a control channel.

Data transmitter 845 may transmit the data during the data symbols and the gap symbol of the first TTI and during the concatenated symbols of the second TTI and transmit at least a portion of the data via the symbols of the second TTI allocated for the control message.

Data portion receiver 850 may receive, during data symbols and a gap symbol of a first TTI within a shared radio frequency spectrum band allocated for vehicle to vehicle communications, a first portion of data from a vehicle, the first TTI allocated for data communications.

Concatenated symbol receiver 855 may receive, during symbols of at least a second TTI within the shared radio frequency spectrum band, a second portion of the data from the vehicle, the second TTI being adjacent to the first TTI, and the symbols of the second TTI being concatenated with the data symbols of the first TTI. In some cases, the concatenated symbols of the second TTI include a set of control symbols, a set of LBT symbols, a set of data symbols, or a combination thereof. In some instances, the second TTI is allocated for control communications. In some examples, a size of the data exceeds a size threshold corresponding to multiple TTIs. In some aspects, the data exceeds a latency threshold. In some examples, the data may include URLLC data.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
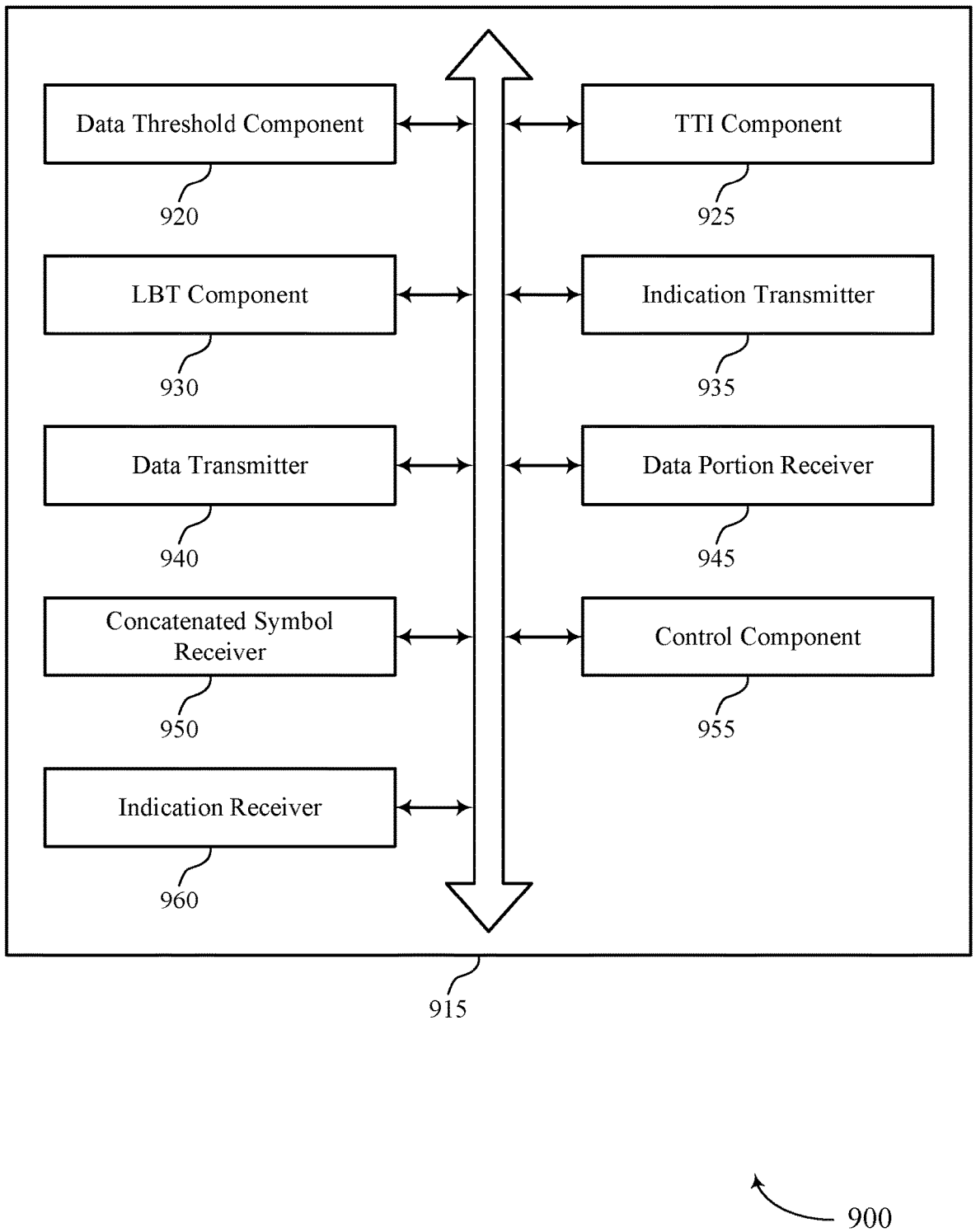

FIG. 9 shows a block diagram 900 of a TTI bundling manager 915 that supports TTI bundling for wireless communications systems in accordance with aspects of the present disclosure. The TTI bundling manager 915 may be an example of aspects of a TTI bundling manager 715, a TTI bundling manager 815, or a TTI bundling manager 1015 described with reference to FIGS. 7, 8, and 10. The TTI bundling manager 915 may include data threshold component 920, TTI component 925, LBT component 930, indication transmitter 935, data transmitter 940, data portion receiver 945, concatenated symbol receiver 950, control component 955, and indication receiver 960. Each of these modules may communicate, directly or indirectly, with one another (e.g., via one or more buses).

Data threshold component 920 may identify that a size of data to be transmitted to a vehicle via a shared radio frequency spectrum band allocated for vehicle to vehicle communications satisfies a size threshold, the data to be transmitted during a first TTI that includes LBT symbols, control symbols, and data symbols. In some cases, the size of the data exceeds the size threshold that corresponds to multiple TTIs. In some examples, the data exceeds a latency threshold. In some examples, the data includes URLLC data.

TTI component 925 may identify at least a second TTI during which the data will be transmitted to the vehicle based on the size of the data satisfying the size threshold, the second TTI being adjacent to the first TTI. In some cases, a number of additional TTIs during which the data is transmitted is below a threshold number of TTIs.

LBT component 930 may perform an LBT procedure on a carrier of the shared radio frequency spectrum band, transmit an LBT reservation message indicating reservation of resources corresponding to the first TTI and the second TTI based on the listening, transmit a single cyclic prefix in the LBT symbol prior to repeating transmission of the single LBT reservation message, and initiate an LBT counter for counting symbols following a symbol during which listening for transmissions is performed. In some cases, performing the LBT procedure includes listening for transmissions over the carrier of the shared radio frequency spectrum band, where a set of resources for transmission of the data is determined based on the listening. In some examples, transmitting the LBT reservation message includes repeating transmission of a single LBT reservation message within an LBT symbol of the first TTI. In some aspects, the LBT reservation message is transmitted in a reservation symbol determined based on the LBT counter. In some implementations, the LBT reservation message is transmitted in a symbol subsequent to a symbol allocated for the listening. In some cases, the symbol subsequent to the symbol allocated for the listening follows a gap symbol.

Indication transmitter 935 may transmit, during the control symbols of the first TTI, an indication that the data will be transmitted during the data symbols and a gap symbol of the first TTI and during symbols of the second TTI that are concatenated with the data symbols of the first TTI based on an outcome of the LBT procedure. In some cases, the concatenated symbols of the second TTI include a set of control symbols, a set of LBT symbols, a set of data symbols, or a combination thereof. In some instances, the indication is included in a control message that is transmitted via a control channel.

Data transmitter 940 may transmit the data during the data symbols and the gap symbol of the first TTI and during the concatenated symbols of the second TTI and transmit at least a portion of the data via the symbols of the second TTI allocated for the control message.

Data portion receiver 945 may receive, during data symbols and a gap symbol of a first TTI within a shared radio frequency spectrum band allocated for vehicle to vehicle communications, a first portion of data from a vehicle, the first TTI allocated for data communications.

Concatenated symbol receiver 950 may receive, during symbols of at least a second TTI within the shared radio frequency spectrum band, a second portion of the data from the vehicle, the second TTI being adjacent to the first TTI, and the symbols of the second TTI being concatenated with the data symbols of the first TTI. In some cases, the concatenated symbols of the second TTI include a set of control symbols, a set of LBT symbols, a set of data symbols, or a combination thereof. In some instances, the second TTI is allocated for control communications. In some examples, a size of the data exceeds a size threshold corresponding to multiple TTIs. In some cases, the data exceeds a latency threshold. In some instances, the data includes URLLC data.

Control component 955 may modify transmission of a control message to be transmitted in the second TTI. In some cases, modifying the transmission of the control message includes refraining from transmitting the control message via symbols of the second TTI allocated for the control message.

Indication receiver 960 may receive an indication that the second portion of the data will be transmitted during the concatenated data symbols of the second TTI. In some cases, the indication is included in a control message that is received via a control channel during control symbols of the first TTI. In some instances, a number of TTIs during which the data is received is below a threshold number of TTIs.

Figure 10:
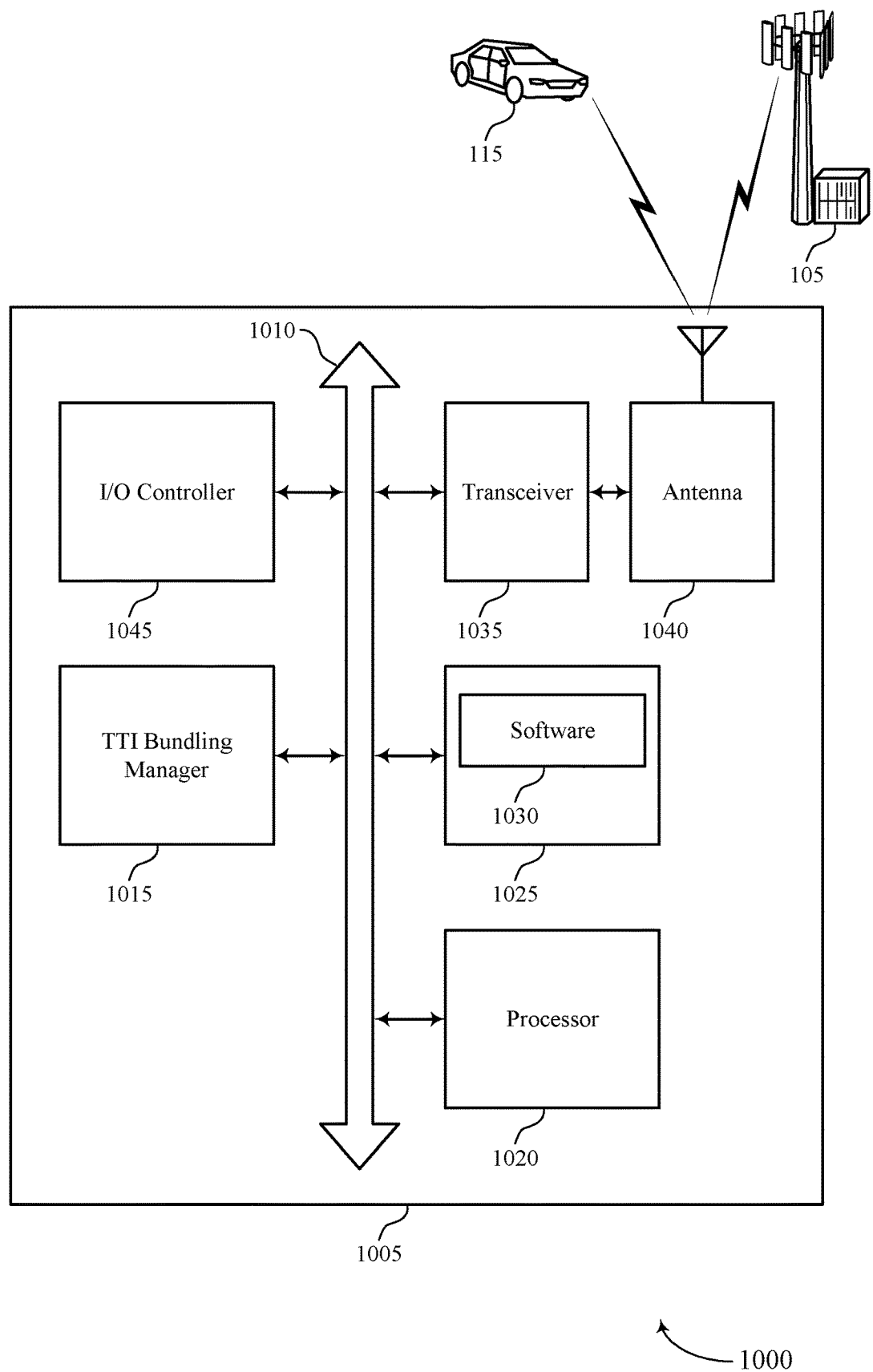
FIG. 10 illustrates a block diagram of a system including a user equipment (UE) that supports TTI bundling for wireless communications systems in accordance with one or more aspects of the present disclosure.

FIG. 10 shows a diagram of a system 1000 including a device 1005 that supports TTI bundling for wireless communications systems in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including TTI bundling manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting TTI bundling for wireless communications systems).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support TTI bundling for wireless communications systems. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas.

In some cases, the wireless device may include a single antenna 1040. However, in some other cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
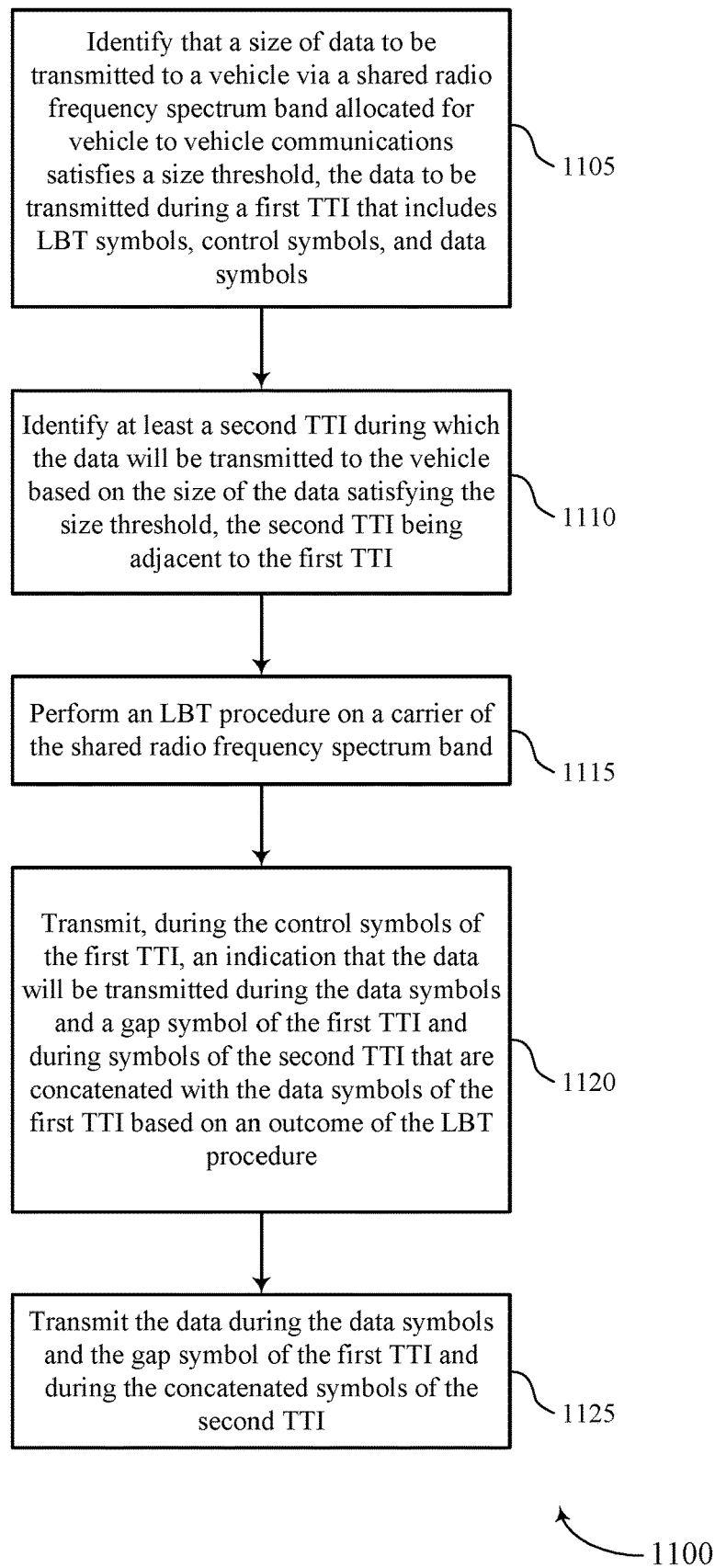
FIGS. 11 and 12 illustrate methods TTI bundling for wireless communications systems in accordance with one or more aspects of the present disclosure.

FIG. 11 shows a flowchart illustrating a method 1100 for TTI bundling for wireless communications systems in accordance with aspects of the present disclosure. The operations of method 1100 may be implemented by a UE 115 or its components as described herein. For example, the operations of method 1100 may be performed by a TTI bundling manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1105 the UE 115 may identify that a size of data to be transmitted to a vehicle via a shared radio frequency spectrum band allocated for vehicle to vehicle communications satisfies a size threshold, the data to be transmitted during a first TTI that includes LBT symbols, control symbols, and data symbols. The operations of block 1105 may be performed according to the methods described herein. In certain examples, aspects of the operations of block 1105 may be performed by a data threshold component as described with reference to FIGS. 7 through 10.

At block 1110 the UE 115 may identify at least a second TTI during which the data will be transmitted to the vehicle based at least in part on the size of the data satisfying the size threshold, the second TTI being adjacent to the first TTI. The operations of block 1110 may be performed according to the methods described herein. In certain examples, aspects of the operations of block 1110 may be performed by a TTI component as described with reference to FIGS. 7 through 10.

At block 1115 the UE 115 may perform an LBT procedure on a carrier of the shared radio frequency spectrum band. The operations of block 1115 may be performed according to the methods described herein. In certain examples, aspects of the operations of block 1115 may be performed by a LBT component as described with reference to FIGS. 7 through 10.

At block 1120 the UE 115 may transmit, during the control symbols of the first TTI, an indication that the data will be transmitted during the data symbols and a gap symbol of the first TTI and during symbols of the second TTI that are concatenated with the data symbols of the first TTI based at least in part on an outcome of the LBT procedure. The operations of block 1120 may be performed according to the methods described herein. In certain examples, aspects of the operations of block 1120 may be performed by an indication transmitter as described with reference to FIGS. 7 through 10.

At block 1125 the UE 115 may transmit the data during the data symbols and the gap symbol of the first TTI and during the concatenated symbols of the second TTI. The operations of block 1125 may be performed according to the methods described herein. In certain examples, aspects of the operations of block 1125 may be performed by a data transmitter as described with reference to FIGS. 7 through 10.

Figure 12:
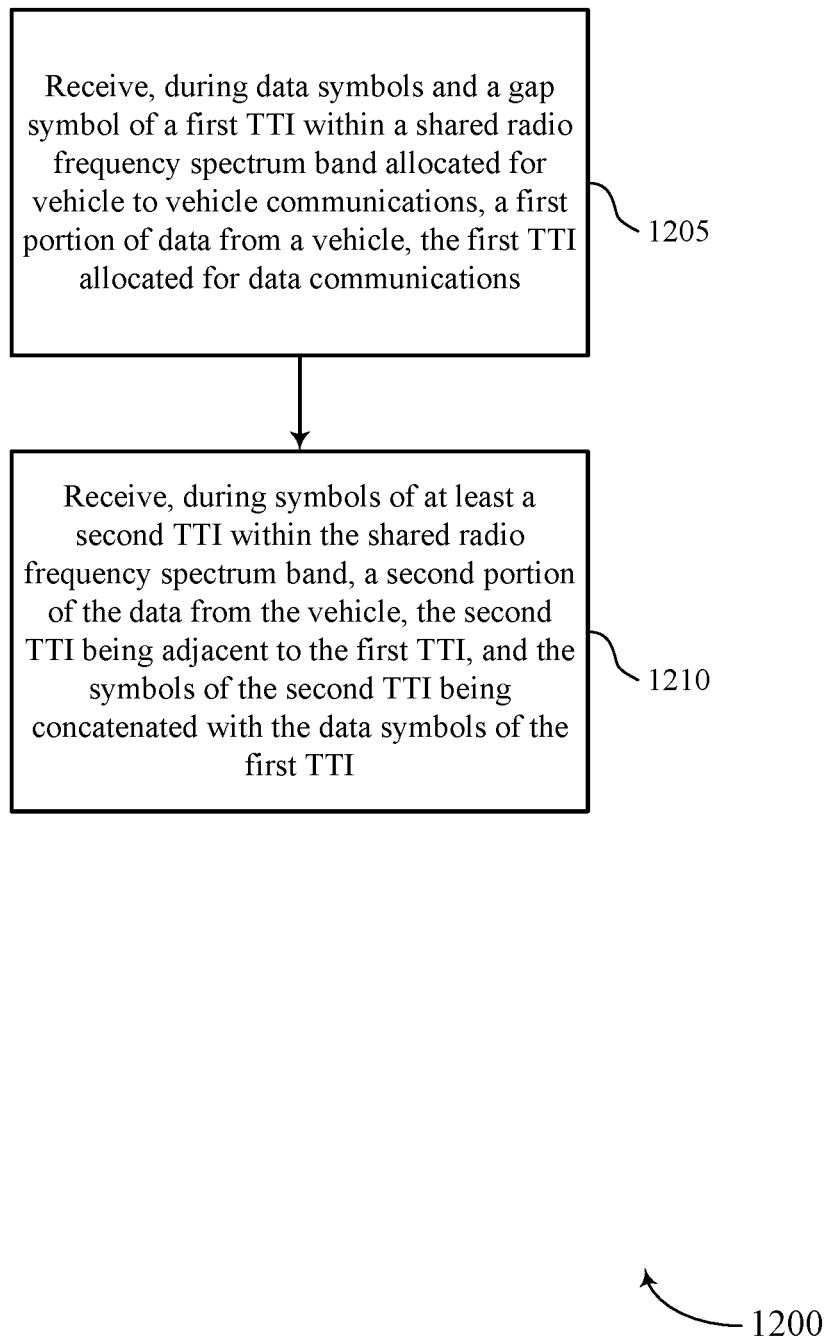

FIG. 12 shows a flowchart illustrating a method 1200 for TTI bundling for wireless communications systems in accordance with aspects of the present disclosure. The operations of method 1200 may be implemented by a UE 115 or its components as described herein. For example, the operations of method 1200 may be performed by a TTI bundling manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1205 the UE 115 may receive, during data symbols and a gap symbol of a first TTI within a shared radio frequency spectrum band allocated for vehicle to vehicle communications, a first portion of data from a vehicle, the first TTI allocated for data communications. The operations of block 1205 may be performed according to the methods described herein. In certain examples, aspects of the operations of block 1205 may be performed by a data portion receiver as described with reference to FIGS. 7 through 10.

At block 1210 the UE 115 may receive, during symbols of at least a second TTI within the shared radio frequency spectrum band, a second portion of the data from the vehicle, the second TTI being adjacent to the first TTI, and the symbols of the second TTI being concatenated with the data symbols of the first TTI. The operations of block 1210 may be performed according to the methods described herein. In certain examples, aspects of the operations of block 1210 may be performed by a concatenated symbol receiver as described with reference to FIGS. 7 through 10.

It should be noted that the methods described above describe possible implementations, and that the operations and the s may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term eNB may be generally used to describe the base stations. The wireless communications system or systems described herein may include a heterogeneous LTE/LTE-A or NR network in which different types of eNBs provide coverage for various geographical regions. For example, each eNB, gNB, or base station may provide communication coverage for a macro cell, a small cell, or other types of cell. The term "cell" may be used to describe a base station, a carrier or CC associated with a base station, or a coverage area (e.g., sector) of a carrier or base station, depending on context.

Base stations may include or may be referred to by those skilled in the art as a base transceiver station, a radio base station, an access point, a radio transceiver, a NodeB, eNB, gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying that a size of data to be transmitted to a vehicle via a shared radio frequency spectrum band allocated for vehicle to vehicle communications satisfies a size threshold, the data to be transmitted during a first transmission time interval (TTI) that includes one or more listen-before-talk (LBT) symbols, one or more control symbols, and one or more data symbols;
   identifying at least a second TTI during which the data will be transmitted to the vehicle based at least in part on the size of the data satisfying the size threshold, the second TTI being adjacent to the first TTI;
   performing an LBT procedure on a carrier of the shared radio frequency spectrum band, comprising:
      listening for transmissions over the carrier of the shared radio frequency spectrum band, wherein a set of resources for transmission of the data is determined based at least in part on the listening;
   transmitting an LBT reservation message indicating reservation of resources corresponding to the first TTI and the second TTI based at least in part on the listening;
   transmitting, during the one or more control symbols of the first TTI, an indication that the data will be transmitted during the one or more data symbols and a gap symbol of the first TTI and during one or more symbols of the second TTI that are concatenated with the one or more data symbols of the first TTI based at least in part on an outcome of the LBT procedure; and
   transmitting the data during the one or more data symbols and the gap symbol of the first TTI and during the concatenated one or more symbols of the second TTI.

2. The method of claim 1, wherein transmitting the LBT reservation message comprises:
   repeating transmission of a single LBT reservation message within an LBT symbol of the first TTI.

3. The method of claim 2, further comprising:
   transmitting a single cyclic prefix in the LBT symbol prior to repeating transmission of the single LBT reservation message.

4. The method of claim 1, further comprising:
   initiating an LBT counter for counting symbols following a symbol during which listening for transmissions is performed.

5. The method of claim 4, wherein the LBT reservation message is transmitted in a reservation symbol determined based at least in part on the LBT counter.

6. The method of claim 1, wherein the LBT reservation message is transmitted in a symbol subsequent to a symbol allocated for the listening.

7. The method of claim 6, wherein the symbol subsequent to the symbol allocated for the listening follows a gap symbol.

8. An apparatus for wireless communication, comprising:
   a processor,
   memory coupled with the processor; and
   instructions stored in the memory and executable by the processor to cause the apparatus to:
      identify that a size of data to be transmitted to a vehicle via a shared radio frequency spectrum band allocated for vehicle to vehicle communications satisfies a size threshold, the data to be transmitted during a first transmission time interval (TTI) that includes one or more listen-before-talk (LBT) symbols, one or more control symbols, and one or more data symbols;
      identify at least a second TTI during which the data will be transmitted to the vehicle based at least in part on the size of the data satisfying the size threshold, the second TTI being adjacent to the first TTI;
      perform an LBT procedure on a carrier of the shared radio frequency spectrum band, comprising:

listening for transmissions over the carrier of the shared radio frequency spectrum band, wherein a set of resources for transmission of the data is determined based at least in part on the listening;

transmit an LBT reservation message indicating reservation of resources corresponding to the first TTI and the second TTI based at least in part on the listening;

transmit, during the one or more control symbols of the first TTI, an indication that the data will be transmitted during the one or more data symbols and a gap symbol of the first TTI and during one or more symbols of the second TTI that are concatenated with the one or more data symbols of the first TTI based at least in part on an outcome of the LBT procedure; and transmit the data during the one or more data symbols and the gap symbol of the first TTI and during the concatenated one or more symbols of the second TTI.

9. The apparatus of claim 8, wherein transmitting the LBT reservation message comprises:

repeating transmission of a single LBT reservation message within an LBT symbol of the first TTI.

10. The apparatus of claim 9, wherein the instructions stored in the memory and executable by the processor further cause the apparatus to:

transmit a single cyclic prefix in the LBT symbol prior to repeating transmission of the single LBT reservation message.

11. The apparatus of claim 8, wherein the instructions stored in the memory and executable by the processor further cause the apparatus to:

initiate an LBT counter for counting symbols following a symbol during which listening for transmissions is performed.

12. The apparatus of claim 11, wherein the LBT reservation message is transmitted in a reservation symbol determined based at least in part on the LBT counter.

13. The apparatus of claim 8, wherein the LBT reservation message is transmitted in a symbol subsequent to a symbol allocated for the listening.

14. The apparatus of claim 13, wherein the symbol subsequent to the symbol allocated for the listening follows a gap symbol.

* * * * *